United States Patent

Herzig et al.

[11] Patent Number: 6,093,782
[45] Date of Patent: Jul. 25, 2000

[54] CROSSLINKABLE COMPOSITIONS

[75] Inventors: Christian Herzig, Waging am See; Oliver Zöllner, Simbach am Inn, both of Germany

[73] Assignee: Wacker-Chemie GmbH, München, Germany

[21] Appl. No.: 09/203,443

[22] Filed: Dec. 1, 1998

[30] Foreign Application Priority Data

Dec. 11, 1997 [DE] Germany .......................... 197 55 151

[51] Int. Cl.[7] .................................................. C08G 77/08
[52] U.S. Cl. ........................... 528/15; 525/478; 525/479; 528/23; 528/31
[58] Field of Search ................... 528/15, 23, 31; 525/478, 479

[56] References Cited

U.S. PATENT DOCUMENTS

| | | |
|---|---|---|
| 3,615,272 | 10/1971 | Collins et al. . |
| 4,639,501 | 1/1987 | Seyferth et al. . |
| 5,241,034 | 8/1993 | Herzig et al. . |
| 5,691,435 | 11/1997 | Herzig et al. . |
| 5,760,145 | 6/1998 | Herzig et al. . |

FOREIGN PATENT DOCUMENTS

| | | |
|---|---|---|
| 0 523 660 | 1/1993 | European Pat. Off. . |
| 0 568 318 | 1/1993 | European Pat. Off. . |
| 1 955 511 | 2/1973 | Germany . |
| 37 16372 | 11/1988 | Germany . |
| 195 22 144 | 1/1997 | Germany . |
| 196 02 663 | 7/1997 | Germany . |
| 196 27 022 | 1/1998 | Germany . |
| WO 98/31727 | 7/1998 | WIPO . |

OTHER PUBLICATIONS

Derwent Abstract 9#88–331463/47) corresponding to DE 37 16 372 A1.
Derwent Abstract (#97–053209/06) corresponding to DE 195 22 144 A1.
CPR: 95–260652/32 corresponding to JP 06–192482A.

Primary Examiner—Edward J. Cain
Attorney, Agent, or Firm—Brooks & Kushman P.C.

[57] ABSTRACT

Crosslinkable compositions comprise novel organosilicon compounds ($B^1$) containing Si-bonded hydrogen atoms and comprising (a) units of the formula $$H_a R_{2-a} SiO_2 O_{2/2} \quad (I),$$

where R is as defined in claim 1 and a is 0, 1 or 2, with the proviso that at least 20 mol % of the units of the formula (I) are ones in which a is 1 or 2, (b) carbostructural units G (II), where G are identical or different and are each a trivalent to decavalent aliphatic hydrocarbon radical having from 7 to 30 carbon atoms per radical, which may contain one or more heteroatoms selected from the group consisting of oxygen, boron, silicon, tin or titanium, with the proviso that at least three Si atoms are connected to one another via G, (c) units of the formula $$R_b SiO_{\frac{3-b}{2}} \quad \text{and/or} \quad (III)$$

$$R_b SiO_{\frac{2-b}{2}} \quad (III')$$

where b is 0, 1 or 2, with the proviso that b in formula (III') is not 2 and with the proviso that the units of the formula (III) or (III') are connected via the Si atoms to the carbostructural units G and (d) units of the formula $$H_c R_{3-c} SiO_{1/2} \quad (I),$$

where c is 0, 1 or 2, with the proviso that the organosilicon compounds ($B^1$) contain on average at least 6 Si-bonded hydrogen atoms.

11 Claims, No Drawings

CROSSLINKABLE COMPOSITIONS

TECHNICAL FIELD

The invention relates to crosslinkable compositions comprising
(A) organosilicon compounds which contain radicals having aliphatic carbon—carbon multiple bonds,
(B) organosilicon compounds containing Si-bonded hydrogen atoms,
(C) catalysts which promote the addition of Si-bonded hydrogen onto aliphatic multiple bonds and, if desired,
(D) agents which inhibit the addition of Si-bonded hydrogen onto aliphatic multiple bonds at room temperature
and also to the use of the crosslinkable compositions for producing coatings which repel sticky materials. The invention further relates to organosilicon compounds containing Si-bonded hydrogen atoms, and to a process for their preparation.

BACKGROUND ART

As crosslinkers for aliphatically unsaturated organopolysiloxanes, use is made virtually exclusively of organopolysiloxanes containing hydrogenmethylsiloxane units, in the simplest case hydrogenmethylpolysiloxane endblocked by triorganosiloxy groups. To increase the reactivity, it has proven useful to incorporate dimethylsiloxane units between the hydrogenmethylsiloxane units by equilibration. However, these measures are only very limited improvements.

Apart from these crosslinkers based on hydrogenmethylsiloxane units, crosslinkers without methyl groups are also known. DE-B 1 955 511 and the corresponding U.S. Pat. No. 3,615,272 describe resins comprising hydrogensiloxane units, i.e. trifunctional units. However, for use as crosslinkers in addition-curing organopolysiloxane compositions, such polymers are only of very limited use, since they have a very low solubility in the crosslinkable diorganopolysiloxanes.

EP-A 568 318 discloses organopolysiloxanes comprising trifunctional siloxane units and monofunctional siloxane units containing Si-bonded hydrogen. According to EP-A 568 318, T units in the form of organosiloxane units are end-blocked with hydrogendimethylsiloxy groups, with a different number of dimethylsiloxane or hydrogenmethylsiloxane units being able to be incorporated between these groups.

According to DE-A 37 16 372, organopolysiloxanes containing Si-bonded hydrogen atoms and from 3 to 5 silicon atoms per molecule are prepared from $[H(CH_3)_2Si]_2O$ and trialkoxysilanes in a hydrolytic process.

DE-A 195 22 144 (Wacker-Chemie GmbH, published on Jan. 2, 1997) discloses polyaddition products comprising hydrogendimethylsiloxane units which are prepared by reacting hydrocarbons having at least three terminal double bonds with short-chain $\alpha,\omega$-dihydrogensiloxanes.

DE-A 196 02 663 (Wacker-Chemie GmbH, published on Jul. 31, 1997) describes carbosiloxane crosslinkers having terminal units of the formula $H_aR_{3-a}SiO_{1/2}$ (where a is preferably 1 and R is a monovalent hydrocarbon radical) and carbostructural units which may comprise units of the formula $H_cR_dSiO_{4-c-d/2}$ (where c is preferably 0 and the sum c+d is preferably 2), i.e. they can also have bifunctional siloxane units. An essential feature of these carbosiloxane crosslinkers is that the total number of Si-bonded hydrogen atoms present in the terminal units is greater than the total number of all Si atoms connected to one another via the carbo-structural unit.

DISCLOSURE OF INVENTION

It is an object of the invention to provide organosilicon compounds which contain Si-bonded hydrogen atoms and crosslink rapidly with organosilicon compounds containing radicals having aliphatic carbon—carbon multiple bonds in the presence of catalysts which promote the addition of Si-bonded hydrogen onto aliphatic multiple bonds, achieving higher crosslinking rates than hitherto. A further object of the invention is to provide crosslinkable compositions which are suitable for producing coatings which repel sticky materials. These objects are achieved by the invention.

BEST MODE FOR CARRYING OUT THE INVENTION

The invention provides crosslinkable compositions comprising
(A) organosilicon compounds which contain radicals having aliphatic carbon—carbon multiple bonds,
(B) organosilicon compounds containing Si-bonded hydrogen atoms,
(C) catalysts which promote the addition of Si-bonded hydrogen onto aliphatic multiple bonds and, if desired
(D) agents which inhibit the addition of Si-bonded hydrogen onto aliphatic multiple bonds at room temperature,
wherein at least part of the organosilicon compounds containing Si-bonded hydrogen atoms (B) used are organosilicon compounds ($B^1$) comprising
(a) units of the formula $$H_aR_{2-a}SiO_{2/2} \tag{I}$$

where R are identical or different and are each a monovalent, halogenated or unhalogenated hydrocarbon radical which is free of aliphatic multiple bonds and has from 1 to 8 carbon atom(s) per radical and
a is 0, 1 or 2,
with the proviso that at least 20 mol % of the units of the formula (I) are ones in which a is 1 or 2,
(b) carbostructural units G (II)
where G are identical or different and are each a trivalent to decavalent aliphatic hydrocarbon radical having from 7 to 30 carbon atoms per radical which may contain one or more heteroatoms selected from the group consisting of oxygen, boron, silicon, tin or titanium,
with the proviso that at least three Si atoms are connected to one another via G,
(c) units of the formula

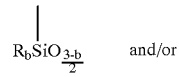 and/or (III)

 (III')

where R is as defined above,
b is 0, 1 or 2, with the proviso that b in formula (III') is not 2, and
with the proviso that the units of the formula (III) or (III') are connected via the Si atoms to the carbostructural units G and (d) units of the formula $$H_cR_{3-c}SiO_{1/2} \quad (IV)$$

where R is as defined above,
c is 0, 1 or 2,
with the proviso that the organosilicon compounds ($B^1$) contain on average at least 6 Si-bonded hydrogen atoms.

The invention further provides organosilicon compounds ($B^1$) containing Si-bonded hydrogen atoms and comprising
(a) units of the formula $$H_aR_{2-a}SiO_{2/2} \quad (I)$$

where R and a are as defined above,
with the proviso that at least 20 mol % of the units of the formula (I) are ones in which a is 1 or 2,
(b) carbostructural units G (II)
where G are identical or different and are each a trivalent to decavalent aliphatic hydrocarbon radical having from 7 to 30 carbon atoms per radical which may contain one or more heteroatoms selected from the group consisting of oxygen, boron, silicon, tin or titanium,
with the proviso that at least three Si atoms are connected to one another via G,
(c) units of the formula $$R_bSiO_{\frac{3-b}{2}} \quad (III)$$

and/or $$R_bSiO_{\frac{2-b}{2}} \quad (III')$$

where R and b are as defined above,
with the proviso that the units of the formula (III) or (III') are connected via Si atoms to the carbostructural units G and
(d) units of the formula $$H_cR_{3-c}SiO_{1/2} \quad (IV)$$

where R and c are as defined above,
with the proviso that the organosilicon compounds ($B^1$) containing Si-bonded hydrogen atoms contain, on average, at least six Si-bonded hydrogen atoms.

The invention also provides a process for preparing the organosilicon compounds ($B^1$) containing Si-bonded hydrogen atoms, which comprises, in a first step, reacting aliphatic hydrocarbon compounds (1) containing aliphatic multiple bonds and having from 7 to 30 carbon atoms, which may each contain one or more heteroatoms selected from the group consisting of oxygen, boron, silicon, tin and titanium, with siloxanes (2) of the formula $$R^1R_2SiO(R_2SiO)_dSiR_2R^1$$

where R is as defined above,
$R^1$ is as defined for R or is a hydrogen atom, with the proviso that at least 50 mol % of the radicals $R^1$ are hydrogen atoms and
d is 0 or an integer from 1 to 200,
in the presence of catalysts (3) which promote the addition of Si-bonded hydrogen onto aliphatic multiple bonds,
where the ratio of Si-bonded hydrogen in siloxane (2) to aliphatic double bonds in hydrocarbon compound (1) is from 1.0 to 5.0,
if desired, further reacting the compounds obtained in this way with $C_4$— to $C_{22}$ alkenes (4) having a terminal aliphatic double bond in the presence of catalysts (3) which promote the addition of Si-bonded hydrogen onto aliphatic multiple bonds, and, in a second step,
equilibrating the compounds obtained in the first process step with organopolysiloxanes (5) which contain Si-bonded hydrogen atoms and comprise units of the formula (I),
with the proviso that the resulting organosilicon compounds ($B^1$) containing Si-bonded hydrogen atoms comprise, on average, at least 20 mol % of units of the formula (I) in which a is 1 or 2 and at least 6 Si-bonded hydrogen atoms.

An essential feature of the novel organosilicon compounds ($B^1$) containing Si-bonded hydrogen atoms is that, in each molecule, the total number of terminal Si-bonded hydrogen atoms, i.e. the Si-bonded hydrogen atoms present in the terminal units of the formula (IV), is less than the total number of all Si atoms connected to one another in the molecule via the carbostructural unit G.

The novel organosilicon compounds ($B^1$) containing Si-bonded hydrogen atoms have good solubility in the above-described constituent (A) of the crosslinkable composition.

The novel organosilicon compounds ($B^1$) containing Si-bonded hydrogen atoms preferably have a viscosity of from 4 to 5000 $mm^2 \cdot s^{-1}$ at 25° C., preferably from 20 to 1000 $mm^2 \cdot s^{-1}$ at 25° C. and particularly preferably from 40 to 400 $mm^2 \cdot s^{-1}$ at 25° C.

The novel organosilicon compounds ($B^1$) containing Si-bonded hydrogen atoms preferably contain, on average, from 6 to 500 Si-bonded hydrogen atoms, preferably from 6 to 300 Si-bonded hydrogen atoms, particularly preferably from 8 to 100 Si-bonded hydrogen atoms and most preferably from 30 to 60 Si-bonded hydrogen atoms.

The novel organosilicon compounds ($B^1$) containing Si-bonded hydrogen atoms preferably have a hydrogen equivalent weight of from 90 to 400 g per mol of Si-bonded hydrogen, preferably from 90 to 200 g per mol of Si-bonded hydrogen and particularly preferably from 120 to 180 g per mol of Si-bonded hydrogen.

The radical R in the organosilicon compounds ($B^1$) containing Si-bonded hydrogen atoms is free of aliphatic multiple bonds so as to avoid the occurrence of self-crosslinking which leads to insoluble material.

Examples of radicals R are alkyl radicals such as methyl, ethyl, n-propyl, iso-propyl, 1-n-butyl, 2-n-butyl, iso-butyl, tert-butyl, n-pentyl, iso-pentyl, neo-pentyl and tert-pentyl radicals; hexyl radicals such as the n-hexyl radical; heptyl radicals such as the n-heptyl radical; octyl radicals such as the n-octyl radical and iso-octyl radicals such as the 2,2,4-trimethylpentyl radical; cycloalkyl radicals such as cyclopentyl, cyclohexyl and cycloheptyl radicals and methylcyclohexyl radicals; aryl radicals such as the phenyl radical; alkaryl radicals such as o-, m-, p-tolyl radicals, xylyl radicals and ethylphenyl radicals and aralkyl radicals such as the benzyl radical, and the α- and β-phenylethyl radicals. Preference is given to the methyl radical.

Examples of halogenated radicals R are haloalkyl radicals such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radicals.
a is preferably 0 or 1.
b is preferably 1 or 2, particularly preferably 2.
c is preferably 0 or 1.
Particularly preferred examples of terminal units of the formula (IV) are the hydrogendimethylsiloxane unit and the trimethylsiloxane unit.

Particularly preferred examples of units of the formula (I) are the hydrogenmethylsiloxane unit and the dimethylsiloxane unit.

The ratio of the Si-bonded hydrogen atoms in the units of the formula (I) (preferably $HRSiO_{2/2}$ units) to the Si-bonded hydrogen atoms in the units of the formula (IV) (preferably $HR_2SiO_{1/2}$ units) is preferably, on average from 8:1 to 100:1, preferably from 10:1 to 60:1.

However, the Si-bonded hydrogen atoms can also be present entirely in the units of the formula (I) and not in the terminal units of the formula (IV), i.e. c in the formula (IV) is then 0.

As carbostructural units G, preference is given to using radicals of the formula

  (II), where $R^4$ is a trivalent to decavalent aliphatically saturated hydrocarbon radical having from 7 to 10 carbon atoms, which may contain one or more hetero-atoms selected from the group consisting of oxygen, boron, silicon, tin and titanium, $R^3$ is a hydrogen atom or an alkyl radical having from 1 to 6 carbon atoms per radical and x is 3, 4, 5, 6, 7, 8, 9 or 10, in particular 3, 4, 5 or 6, particularly preferably 3.

The term "aliphatically saturated" means that $R^4$ contains no aliphatic double or triple bonds. $R^4$ may be aromatic.

Examples of alkyl radicals $R^3$ are the methyl, ethyl, n-propyl iso-propyl, 1-n-butyl, 2-n-butyl, iso-butyl, tert-butyl, n-pentyl, iso-pentyl, neo-pentyl and tert-pentyl radicals and hexyl radicals such as the n-hexyl radical. $R^3$ is preferably a hydrogen atom.

Examples of trivalent carbostructural units G are those of the formulae
(—CH$_2$CH$_2$)$_3$C$_6$H$_9$
(—CH$_2$CH$_2$)$_3$C$_6$H$_3$
(—CH$_2$CH$_2$CH$_2$OCH$_2$)$_3$C—CH$_2$CH$_3$
(—CH$_2$CH$_2$CH$_2$)$_3$B
(—CH$_2$CH$_2$)$_3$SiCH$_3$ and
(—CH$_2$CH$_2$)$_3$SnC$_4$H$_9$.

Examples of tetravalent carbostructural units G are those of the formulae
(—CH$_2$CH$_2$)$_4$C$_4$H$_4$
(—CH$_2$CH$_2$)$_4$Si
(—CH$_2$CH$_2$)$_4$Sn
(—CH$_2$CH$_2$)$_4$Ti
(—CH$_2$CH$_2$CH$_2$O)$_2$CH—CH(OCH$_2$CH$_2$CH$_2$)$_2$ and

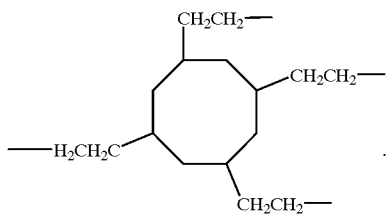

Higher-valent carbostructural units G can be those of the formula

or saturated oligomers of dienes such as butadiene or isoprene.

Preferred carbostructural units G are those having a valence of 3, 4, 5 and 6; particular preference is given to trivalent carbostructural units.

The units (c) present in the organosilicon compounds ($B^1$) containing Si-bonded hydrogen atoms are preferably units of the formula (III).

Examples of organosilicon compounds ($B^1$) containing Si-bonded hydrogen atoms are branched compounds which can be prepared by, in a 1st step, reacting trivinylmethylsilane or 1,2,4-trivinylcyclohexane with a stoichiometric excess of linear siloxanes (2) using catalysts (3) and, in a second step, equilibrating this branched precursor with an equilibrate of hydrogenmethylsiloxane, dimethylsiloxane and trimethylsiloxane units or a hydrogenmethylpolysiloxane having terminal trimethylsiloxane units. To adjust the viscosity or the content of Si-bonded hydrogen, cyclic or linear dialkyl(poly)siloxanes can be added in appropriate amounts in the second step.

The hydrocarbon compounds (1) used in the first process step of the process of the invention preferably contain from 3 to 10 aliphatic double bonds, preferably from 3 to 6 aliphatic double bonds, particularly preferably 3 aliphatic double bonds.

As hydrocarbon compounds (1), preference is given to using those of the formula

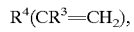

where $R^4$, $R^3$ and x are as defined above.

Examples of hydrocarbon compounds (1) are 1,2,4-trivinylcyclohexane, 1,3,5-trivinylcyclohexane, 1,3,5-trivinylbenzene, triallylboron, trimethylolpropane triallyl ether, trivinylmethylsilane, trivinylbutyltin, tetravinylcyclobutane, tetravinylidenecyclobutane, tetravinyltitanium, 1,1,2,2-tetraallyloxyethane, cyclooctatetraene, 1,3,5,7-tetravinylcyclooctane, 1,2-bis(trivinylsilyl)ethane, oligobutadiene, and oligoisoprene. One type of hydrocarbon compound (1) or different types of hydrocarbon compounds (1) can be used in the first process step of the process of the invention.

The siloxanes (2) used in the process of the invention are preferably ones of the formula

where R and d are as defined above. One type of siloxane (2) or different types of siloxanes (2) can be used in the first process step of the process of the invention.

In the first process step of the process of the invention, the ratio of Si-bonded hydrogen in siloxane (2) to aliphatic double bonds in the hydrocarbon compound (1) is preferably from 1.5 to 5.0, more preferably from 1.5 to 3.5, particularly preferably from 1.6 to 2.5.

In the process of the invention, equilibrates of $HR_2SiO_{1/2}$, $R_2SiO$ and $R_3SiO_{1,2}$ units such as equilibrates of hydrogendimethylsiloxane, trimethylsiloxane and dimethylsiloxane units can be used as siloxanes (2). To obtain organosilicon compounds ($B^1$) containing Si-bonded hydrogen atoms in which c is 0, i.e. having terminal units of the formula (IV) without Si-bonded hydrogen atoms, the compounds obtained in this way, as long as they still have terminal units of the formula $HR_2SiO_{1/2}$, can be further reacted in the first process step with alkenes (4) such as 1-octene, 1-dodecene, 1-hexadecene or 1-octadecene. The alkenes (4) are used in such amounts that the ratio of aliphatic double bonds in alkenes (4) to Si-bonded hydrogen in the compounds obtained in the first process step is preferably from 1.0:1 to 1.5:1.

The catalysts (3) used in the process of the invention for promoting the addition of Si-bonded hydrogen onto aliphatic double bonds can be the same catalysts which have also been able to be used hitherto to promote the addition of Si-bonded hydrogen onto aliphatic multiple bonds. The catalysts (3) are preferably metals selected from the platinum metal group or compounds or complexes of the platinum group metals. Examples of such catalysts are metallic and finely divided platinum, which may be present on supports such as silicon dioxide, aluminum oxide or activated carbon, compounds or complexes of platinum, for example platinum halides such as $PtCl_4$, $H_2PtCl_6 \cdot 6H_2O$ and $Na_2PtCl_4 \cdot 4H_2O$, platinum-olefin complexes, platinum-alcohol complexes, platinum-vinylsiloxane complexes such as platinum-1,3-divinyl-1,1,3,3-tetramethyldisiloxane complexes with or without detectable inorganically bound halogen, trimethylenedipyridineplatinum dichloride, dicyclopentadieneplatinum dichloride, cyclooctadieneplatinum dichloride, norbornadieneplatinum dichloride and also reaction products of platinum tetrachloride with olefins.

The catalyst (3) used in the first process step is preferably employed in amounts of from 1 to 50 ppm by weight (parts by weight per million parts by weight), more preferably in amounts of from 1 to 5 ppm by weight, in each case calculated as elemental platinum and based on the total weight of hydrocarbon compound (1) and siloxane (2).

The first process step is preferably carried out at the pressure of the surrounding atmosphere, i.e. at about 1020 hPa (abs.), but it can also be carried out at higher or lower pressures. Furthermore, the first process step is preferably carried out at a temperature of from 20° C. to 150° C., preferably from 20° C. to 120° C., particularly preferably from 40° C. to 120° C.

In the first process step, it is possible to make concomitant use of inert, organic solvents, although the use of inert, organic solvents is not preferred. Examples of inert, organic solvents are toluene, xylene, octane isomers, butyl acetate, 1,2-dimethoxyethane, tetrahydrofuran and cyclohexane. Inert siloxanes such as hexamethyldisiloxane or cyclic dimethylsiloxanes having from 3 to about 8 siloxane units can be used as solvent. Any inert organic solvents used are preferably removed by distillation after the first process step.

In the second process step, the organopolysiloxanes (5) containing Si-bonded hydrogen atoms which are used are preferably ones selected from the group consisting of linear organopolysiloxanes having terminal triorganosiloxy groups and having the formula $R_3'SiO(SiR_2'O)_rSiR_3'$, where R' is as defined for R or is a hydrogen atom,
r is 0 or an integer from 1 to 500, preferably from 10 to 200,
linear organopolysiloxanes having terminal hydroxyl groups and having the formula $HO(SiR_2'O)_sH$, where R' is as defined above and
s is an integer from 1 to 1000, preferably from 10 to 500,
branched organopolysiloxanes which may contain hydroxyl groups and comprise units of the formula $R_3'SiO_{1/2}$, $R_2'SiO$ and $R'SiO_{3/2}$, where R' is as defined above,
cyclic organopolysiloxanes of the formula $(R_2'SiO_2)_t$, where R' is as defined above and
t is an integer from 3 to 12,
and copolymers comprising units of the formula $R_2'SiO$ and $R'SiO_{3/2}$, where R' is as defined above.

Preferred organopolysiloxanes (5) are those of the formulae $R_3'SiO(SiR_2'O)_rSiR_3'$ and $HO(SiR_2'O)_sH$.

The ratio of the organopolysiloxanes (5) and SiH-containing compounds used in the equilibration is determined by the desired content of Si-bonded hydrogen atoms, in particular the proportion of units of the formula (I) in which a is 1 or 2, in the organosilicon compounds ($B^1$) generated in the equilibration and by the desired mean chain length.

In the equilibration, use is made of acid catalysts which promote the equilibration.

Examples of acid catalysts are sulfuric acid, phosphoric acid, trifluoroacetic acid, phosphonitrilic chlorides and acid catalysts which are solid under the reaction conditions, e.g. acid-activated bleaching earths, acid zeolites, sulfonated carbon and sulfonated styrene-divinylbenzene copolymer. Preference is given to phosphonitrilic chlorides. Phosphonitrilic chlorides are preferably used in amounts of from 5 to 1000 ppm by weight (=parts per million), in particular from 50 to 200 ppm by weight, in each case based on the total weight of the SiH-containing compounds and organopolysiloxanes (5) used.

The equilibration is preferably carried out at from 100° C. to 150° C. and at the pressure of the surrounding atmosphere, i.e. at about 1020 hPa (abs.). However, higher or lower pressures can also be employed if desired. The equilibration is preferably carried out in from 5 to 20% by weight, based on the total weight of the SiH-containing compounds and organopolysiloxanes (5) used in each case, of a water-immiscible solvent such as toluene. Before work-up of the mixture obtained in the equilibration, the catalyst can be inactivated.

In the process of the invention, the organosilicon compounds ($B^1$) containing Si-bonded hydrogen atoms obtained in this way can, if desired, be equilibrated in a third step with organopolysiloxanes (6) selected from the group consisting of linear organopolysiloxanes having terminal triorganosiloxy groups, linear organopolysiloxanes having terminal hydroxyl groups, branched organopolysiloxanes which may contain hydroxyl groups, cyclic organopolysiloxanes and copolymers of diorganosiloxane and monoorganosiloxane units,
with the proviso that the resulting organosilicon compounds ($B^1$) containing Si-bonded hydrogen atoms comprise, on average, at least 20 mol % of units of the formula (I) in which a is 1 or 2 and at least 6 Si-bonded hydrogen atoms.

The process of the invention can be carried out batchwise, semicontinuously or fully continuously.

The crosslinkable compositions comprising the novel organosilicon compounds ($B^1$) containing Si-bonded hydrogen atoms are preferably used for producing coatings which repel sticky materials, e.g. for producing release papers.

The production of the self-adhesive materials on the release paper is carried out by the off-line process or the on-line process. In the off-line process, the silicone composition is applied to the paper and crosslinked, then, in a subsequent step, usually after winding the release paper onto a roll and after storage of the roll, an adhesive film which is, for example, present on a label face paper is applied to the coated paper and the composite is then pressed together. In the on-line process, the silicone composition is applied to the paper and crosslinked, the silicone coating is coated with the adhesive, the label face paper is then applied to the adhesive and the composite is finally pressed together.

The constituents (A) used in the compositions of the invention can also be the same organosilicon compounds having aliphatic carbon—carbon multiple bonds which have been able to be used in all previously known crosslinkable compositions comprising organosilicon compounds having aliphatic carbon—carbon multiple bonds, organosilicon compounds containing Si-bonded hydrogen atoms and catalysts which promote the addition of Si-bonded hydrogen onto aliphatic multiple bonds.

One type of constituent (A) or different types of constituent (A) can be used in the compositions of the invention.

As organosilicon compounds (A) which contain radicals having aliphatic carbon—carbon multiple bonds, preference is given to using linear or branched organopolysiloxanes comprising units of the formula $$R_e^5 R_f^6 SiO_{\frac{4-e-f}{2}},\qquad (V)$$

where $R^5$ is a monovalent hydrocarbon radical which is free of aliphatic carbon—carbon multiple bonds and has from 1 to 18 carbon atom(s) per radical and $R^6$ is a monovalent hydrocarbon radical having at least one terminal aliphatic carbon—carbon multiple bond and from 2 to 12 carbon atoms per radical,
e is 0, 1, 2 or 3,
f is 0, 1 or 2
and the sum e+f is 0, 1, 2 or 3,
with the proviso that, on average, at least one radical $R^6$ is present per molecule, preferably at least two radicals $R^6$ per molecule.

Preferred organosilicon compounds (A) are organopolysiloxanes of the formula $$R_g^6 R_{3-g}^5 SiO(SiR_2^5 O)_n (SiR^5 R^6 O)_m SiR_{3-g}^5 R_g^6 \qquad (VI),$$

where $R^5$ and $R^6$ are as defined above,
g is 0, 1 or 2,
n is 0 or an integer from 1 to 1500 and
m is 0 or an integer from 1 to 200,
with the proviso that at least one radical $R^6$ is present per molecule, in particular at least two radicals $R^6$ per molecule.

For the purposes of the present invention, formula (VI) should be interpreted in such a way that n units of the formula —(SiR$_2^5$O)— and m units of the formula —(SiR$^5$R$^6$O)— can be distributed in any way within the organopolysiloxane molecule.

As organosilicon compounds (A), it is also possible to use alkenyl-containing siloxane copolymers as described in U.S. Pat. No. 5,241,034 (Wacker-Chemie GmbH), which comprise siloxane blocks and hydrocarbon blocks. The alkenyl-containing siloxane copolymers described in US-A 5,241,034 are therefore incorporated by reference in the present application.

Other compounds which can be used as organosilicon compounds (A) are organopolysiloxanes containing aliphatically unsaturated hydrocarbon radicals, as are described in DE 196 27 022 (Wacker-Chemie GmbH) or DE 197 01 393 (Wacker-Chemie GmbH). The organopolysiloxanes described in DE 196 27 022 comprise tri-functional (T) and/or tetrafunctional (Q) units having unsaturated hydrocarbon radicals. The organopolysiloxanes described in DE 196 27 022 and DE 197 01 393 are therefore incorporated by reference in the present application.

The organosilicon compounds (A) preferably have an average viscosity of from 100 to 100,000 mPa·s at 25° C., more preferably from 100 to 10,000 mPa·s at 25° C., particularly preferably from 100 to 500 mPa·s at 25° C.

Examples of hydrocarbon radicals $R^5$ are alkyl radicals such as the methyl, ethyl, n-propyl, iso-propyl, n-butyl, iso-butyl, tert-butyl, n-pentyl, iso-pentyl, neo-pentyl and tert-pentyl radicals; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as cyclopentyl, cyclohexyl and cycloheptyl radicals and methylcyclohexyl radicals; aryl radicals such as the phenyl, naphthyl, anthryl and phenanthryl radicals; alkaryl radicals such as o-, m- and p-tolyl radicals, xylyl radicals and ethylphenyl radicals; and aralkyl radicals such as the benzyl radical, the α- and β-phenylethyl radicals.

Examples of radicals $R^6$ are alkenyl radicals such as the vinyl, 5-hexenyl, 2,4-divinylcyclohexylethyl, 3,4-divinylcyclohexylethyl, 2-propenyl, 3-butenyl and 4-pentenyl radicals; and alkynyl radicals such as the ethynyl and 2-propynyl radicals.

The novel organosilicon compounds (B$^1$) containing Si-bonded hydrogen atoms can be used in the known crosslinkable compositions comprising
(A) organosilicon compounds containing radicals having aliphatic carbon—carbon multiple bonds,
(B) organosilicon compounds containing Si-bonded hydrogen atoms and
(C) catalysts which promote the addition of Si-bonded hydrogen onto aliphatic multiple bonds,
to completely or partially replace the organosilicon compounds (B) containing Si-bonded hydrogen atoms.

If longer processing times are desired, the crosslinkable compositions of the invention can comprise, as constituent (B), not only the organosilicon compounds (B$^1$) of the invention but also other known organosilicon compounds (B$^2$) containing Si-bonded hydrogen atoms.

As organosilicon compounds (B$^2$) containing Si-bonded hydrogen atoms, preference is given to using organopolysiloxanes comprising units of the formula $$H_k R_1 SiO_{\frac{4-(k+1)}{2}}$$

where R is as defined above,
k is 0 or 1,
l is 0, 1, 2, or 3 and
the sum k+l is not greater than 3,
preferably those of the formula $$H_y R_{3-y} SiO(SiR_2 O)_o (SiRHO)_p SiR_{3-y} H_y$$

where R is as defined above,
y is 0 or 1,
o is 0 or an integer from 1 to 100 and
p is 0 or an integer from 1 to 100.

Examples of such organopolysiloxanes are, in particular, copolymers of dimethylhydrogensiloxane, methylhydrogensiloxane, dimethylsiloxane and trimethylsiloxane units, copolymers of trimethylsiloxane, dimethylhydrogensiloxane and methylhydrogensiloxane units, copolymers of trimethylsiloxane, dimethylsiloxane and methylhydrogensiloxane units, copolymers of methylhydrogensiloxane and trimethylsiloxane units, copolymers of methylhydrogensiloxane, diphenylsiloxane and trimethylsiloxane units, copolymers of methylhydrogensiloxane, dimethylhydrogensiloxane and diphenylsiloxane units, copolymers of methylhydrogensiloxane, phenylmethylsiloxane, trimethylsiloxane and/or dimethylhydrogensiloxane units, copolymers of methylhydrogensiloxane, dimethylsiloxane, diphenylsiloxane, trimethylsiloxane and/or dimethylhydrogensiloxane units and also copolymers of dimethylhydrogensiloxane, trimethylsiloxane, phenylhydrogensiloxane, dimethylsiloxane and/or phenylmethylsiloxane units.

Constituent (B) is preferably used in amounts of from 0.8 to 5.0, more preferably from 0.8 to 2.5, particularly preferably from 1.0 to 2.0, gram atom of Si-bonded hydrogen per mole of Si-bonded radical having an aliphatic carbon—carbon multiple bond in constituent (A).

The catalysts (C) used in the compositions of the invention to promote the addition of Si-bonded hydrogen onto aliphatic double bonds can be the same catalysts which have also been able to be used in the previously known compositions for crosslinking organosilicon compounds containing aliphatic multiple bonds with compounds containing Si-bonded hydrogen. As constituent (C), preference is given to using the abovementioned catalysts (3).

The catalyst (C) is preferably used in amounts of from 5 to 500 ppm by weight (parts by weight per million parts by weight), in particular from 10 to 200 ppm by weight, in each case calculated as elemental platinum metal and based on the total weight of the organosilicon compounds (A) and (B).

Examples of further constituents which can be concomitantly used in the compositions of the invention are agents which inhibit the addition of Si-bonded hydrogen onto aliphatic multiple bonds at room temperature, known as inhibitors (D), and agents for adjusting the release force, solvents, coupling agents and pigments.

Inhibitors (D) used in the compositions of the invention can be any inhibitors which have also been able to be used hitherto for the same purpose. Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. at 1012 mbar (abs.) and at least one aliphatic triple bond, e.g. 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, inhibitors such as a mixture of diallyl maleate and vinyl acetate, inhibitors such as monoesters of maleic acid and inhibitors such as the compound of the formula HC≡C—C(CH$_3$)(OH)—CH$_2$—CH$_2$—CH═C(CH$_3$)$_2$, commercially available under the trade name "Dehydrolinalool" from BASF.

The inhibitor (D) is preferably used in amounts of from 0.01 to 10% by weight, based on the total weight of the organosilicon compounds (A) and (B).

Examples of agents for adjusting the release force of the anti-adhesive coatings produced using the compositions of the invention are silicone resins comprising units of the formula

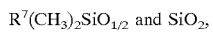

R$^7$(CH$_3$)$_2$SiO$_{1/2}$ and SiO$_2$, known as MQ resins, where R$^7$ is a hydrogen atom, a methyl radical, a vinyl radical or a radical A which is described in the above-cited U.S. Pat. No. 5,241,034 and is therefore incorporated by reference in the present application, and the units of the formula R$^7$(CH$_3$)$_2$SiO$_{1/2}$ can be identical or different. The ratio of units of the formula R$^7$(CH$_3$)$_2$SiO$_{1/2}$ to units of the formula SiO$_2$ is preferably from 0.6 to 2. The silicone resins are preferably used in amounts of from 5 to 80% by weight, based on the total weight of the organosilicon compounds (A) and (B).

The solvents which may be concomitantly used in the compositions of the invention can be the same solvents which have been able to be used in the previously known compositions comprising organopolysiloxanes containing Si-bonded vinyl groups, organopolysiloxanes containing Si-bonded hydrogen and a catalyst which promotes the addition of Si-bonded hydrogen onto aliphatic double bonds. Examples of such solvents are benzines, e.g. alkane mixtures having a boiling range of from 80° C. to 140° C. at 1012 mbar (abs.), n-heptane, benzene, toluene and xylenes, halogenated alkanes having from 1 to 6 carbon atom(s), e.g. methylene chloride, trichloroethylene and perchloroethylene, ethers such as di-n-butyl ether, esters such as ethyl acetate and ketones such as methyl ethyl ketone and cyclohexanone.

If organic solvents are used, they are advantageously used in amounts of from 10 to 95% by weight, based on the weight of the organosilicon compounds (A).

The order of mixing the constituents (A), (B), (C) and, if used (D) is not decisive, but in practice it has been found to be useful to add the constituent (C), i.e. the catalyst, last to the mixture of the other constituents.

Crosslinking of the compositions of the invention is preferably carried out at from 50° C. to 150° C., more preferably from 70° C. to 120° C. An advantage of the compositions of the invention is that rapid crosslinking is achieved even at low temperatures. Energy sources used for thermal crosslinking are preferably ovens, e.g. convection drying ovens, heating channels, heated rollers, heated plates or heat radiation in the infrared region.

Apart from thermal crosslinking, the compositions of the invention can also be crosslinked by irradiation with ultraviolet light or by irradiation with UV and IR light. The ultraviolet light used is usually that having a wavelength of 253.7 nm. There are many commercial lamps which emit ultraviolet light having a wavelength of from 200 to 400 nm and preferably emit ultraviolet light having a wavelength of 253.7 nm.

The application of the compositions of the invention to the surfaces to be made repellent to sticky materials can be carried out in any way which is suitable and widely known for producing coatings from liquid materials, for example by dipping, painting, casting, spraying, rolling on, printing, e.g. by means of an offset gravure coating apparatus, blade coating or by means of an air brush.

The surfaces to be made repellent to sticky materials and which can be treated according to the invention can be surfaces of any materials which are solid at room temperature and 1012 mbar (abs.). Examples of such surfaces are those of paper, wood, cork and plastic films, e.g. polyethylene films or polypropylene films, woven and nonwoven fabric of natural or synthetic fibers or glass fibers, ceramic articles, glass, metals, polyethylene-coated paper and of board, including that made of asbestos. The abovementioned polyethylene can in each case be high-pressure, intermediate-pressure or low-pressure polyethylene. The paper can be low-grade types of paper, e.g. absorbent papers, including raw, i.e. not pretreated with chemicals and/or polymeric natural materials, kraft paper having a weight of from 60 to 150 g/m$^2$, unsized papers, low-beaten papers, wood-containing papers, unsupercalendered or uncalendered papers, papers which are glazed on one side due to use of a Yankee cylinder in their production without further complicated measures and are therefore known as "one-sided machine-glazed papers", uncoated papers or papers produced from paper waste, i.e. recycled paper. The paper to be treated according to the invention can, of course, also be high-grade types of paper such as low-absorbency papers, sized papers, high-beaten papers, wood-free papers, calendered or supercalendered papers, parchment papers, parchmentized papers or precoated papers. The cardboard can also be high- or low-grade.

The compositions of the invention are suitable, for example, for producing release papers, covering papers and substrate papers, including substrate papers which are used in the production of, for example, cast or decorative films or of foams, including polyurethane foam. The compositions of the invention are also suitable, for example, for producing release, covering and substrate cardboard, films and fabrics, for application to the reverse sides of self-adhesive tapes or self-adhesive films or to the printed sides of self-adhesive labels. The compositions of the invention can also be used for the finishing of packaging material, for example packaging material made of paper, cardboard boxes, metal films and drums, e.g. cardboard, plastic, wood or iron, which is or are intended for storage and/or transport of sticky goods such as adhesives, sticky foods, e.g. cakes, honey, sweets and meat, bitumen, asphalt, greased materials and raw rubber. A further example of the use of the compositions of the invention is the coating of supports for transferring pressure-sensitive adhesive layers in the transfer process.

The compositions of the invention are suitable for producing the self-adhesive materials on the release paper both by the off-line process and by the on-line process.

EXAMPLE 1

An equilibrate of hydrogendimethylsiloxane and trimethylsiloxane units in a molar ratio of 3:2, which contains 8.26 g of Si-bonded hydrogen, is reacted at 75° C. with 1,2,4-trivinylcyclohexane, using the platinum-1,3-divinyltetramethyldisiloxane complex known as the Karstedt catalyst, in such proportions that the ratio C=C/SiH is exactly 1.0 and the overall mixture contains about 4 ppm of Pt (calculated as metal). The resulting product comprising carbostructural units and disiloxane units is free of Si-bonded hydrogen and has only trimethylsiloxane units as end units. The $^1$H-NMR spectrum confirms the complete hydrosilylation of the vinyl groups used.

53 g of this carbosiloxane (corresponding to 0.10 mol of substituted cyclohexane) are heated at 120° C. and 5 hPa and equilibrated at 120° C. with 507 g of an equilibrate of trimethylsiloxane, dimethylsiloxane and hydrogenmethylsiloxane units having a mean chain link of 106 siloxane units and containing 0.61% by weight of Si-bonded hydrogen using 200 ppm of $PNCl_2$. Neutralization with MgO (6 g), filtration and low-pressure heat treatment (120° C/5 hPa) gives 506 g of a branched crosslinker containing 0.60% by weight of Si-bonded hydrogen and about 3% by weight of carbostructural units. The end groups are exclusively trimethylsiloxane units.

EXAMPLE 2

13.5 g of 1,2,4-trivinylcyclohexane are homogeneously mixed with 182 g of an α,ω-dihydrogendimethylpolysiloxane containing 0.22% by weight of Si-bonded hydrogen and reacted in the presence of 1 ppm of platinum in the form of the Karstedt catalyst. After half an hour, 80 mg of $PNCl_2$ are added and stirred in until homogeneous, followed by 195 g of an equilibrate of hydrogenmethylsiloxane, dimethylsiloxane and trimethylsiloxane units having an average chain length of 48 siloxane units and containing 1.22% by weight of Si-bonded hydrogen. The components are equilibrated for two hours at 120° C. and then neutralized with 8 g of MgO. Filtration and removal of volatile constituents gives a clear oil having a viscosity of 120 mm/s at 25° C. and containing 0.60% by weight of Si-bonded hydrogen. The ratio of trimethylsiloxane end groups to hydrogendimethylsiloxane end groups is 1:2.

EXAMPLE 3

1,2,4-Trivinylcyclohexane and the α,ω-dihydrogendimethylpolysiloxane are reacted as described in Example 2 in the same amounts. After a reaction time of half an hour at about 90° C., 18 g of 1-octene are added and the mixture is stirred for a further half hour. The subsequent reaction steps are carried out similarly to Example 2. After work-up, a clear oil having a viscosity of 124 mm$^2$/s at 25° C. and containing 0.55% by weight of Si-bonded hydrogen is obtained. The ratio of trimethylsiloxane end groups to octyldimethylsiloxane end groups is 1:2.

EXAMPLE 4

514 g of a short-chain α,ω-dihydrogendimethylpolysiloxane containing 1.05% by weight of Si-bonded hydrogen are admixed with 1.6 mg of platinum in the form of the Karstedt catalyst and heated to about 100° C. 162 g of 1,2,4-trivinylcyclohexane are metered in over a period of about one hour, with the temperature of the mixture reaching 134° C. After a further hour, volatile components still present are distilled out (3 hPa). The polyaddition product has a viscosity of 187 mm$^2$/s at 25° C.

175 g of this carbosiloxane are equilibrated at 120° C. with 350 g of a hydrogenmethylpolysiloxane having trimethylsiloxane units as end groups and containing 1.59% by weight of Si-bonded hydrogen in the presence of 200 ppm of $PNCl_2$ as catalyst. After three hours, the mixture is cooled and neutralized with 11 g of MgO. Filtration and removal of volatile constituents gives a branched equilibrate containing 1.10% by weight of Si-bonded hydrogen and having a viscosity of 163 mm/s at 25° C. The ratio of hydrogenmethylsiloxane units to hydrogendimethylsiloxane units is 94:6.

EXAMPLE 5 AND COMPARATIVE EXPERIMENTS 1 And 2

Ready-to-use formulations are prepared by adding 2.5 g of 1-ethynylcyclohexanol and 10 g of a solution of Karstedt catalyst in vinyl polymer (1.0% of platinum) in succession to 1.00 kg of an α,ω-divinyldimethylpolysiloxane having an iodine number of 6.6. For comparison, the mixtures are treated with different crosslinkers in each case:

a) For Example 5, 47 g of the carbosiloxane crosslinker according to the invention from Example 4;
b) For Comparative Example 1, 33 g of a commercial, unbranched crosslinker comprising hydrogenmethylsiloxane and trimethylsiloxane units and containing 1.59% by weight of Si-bonded hydrogen;
c) For Comparative Example 2, 54 g of a highly branched crosslinker as described in Example 1 of DE-A 196 02 663, which has Si-bonded hydrogen atoms only in hydrogendimethylsiloxane units.

The formulations are in each case catalyzed by 100 ppm of platinum (calculated as metal) and are adjusted to an SiH/Si-vinyl ratio of 2.0.

The ready-to-use mixtures display the gelling times shown in Table 1 below:

TABLE 1

| | Example 5 | Comparative Example 1 | Comparative Example 2 |
|---|---|---|---|
| Gelling time [h] at 25° C. | >70 | >70 | 0.8 |

Since the gelling time of the formulation with crosslinker c) was much too short and its pot life was therefore not acceptable, this formulation was not used in the following coating experiments:

The mixtures containing the crosslinker a) according to the invention and the comparative crosslinker b) meet the requirement of a processing time of at least 8 hours. They were used for coating glassine paper in a pilot coating machine having a drying channel length of 2.8 m and a circulated air temperature of 130° C. The results are summarized in Table 2.

TABLE 2

| Web speed [m/min] | Formulation with a) (Example 5) Extractable, uncrosslinked coating constituents [%] | Formulation with b) (Comparative Example 1) Extractable, uncrosslinked coating constituents [%] |
|---|---|---|
| 10 | 2.1 | 4.4 |
| 30 | 2.3 | 5.7 |
| 50 | 3.3 | 10.8 |
| 70 | 3.9 | 21.8 |
| 100 | 8.6 | greasy |
| 120 | 15.3 | liquid |
| 150 | 32.3 | liquid |

The coating formulation containing the carbosiloxane crosslinker according to the invention thus allows a much higher web speed for achieving comparable curing quality.

What is claimed is:

1. A crosslinkable composition comprising
   (A) organosilicon compounds which contain radicals having aliphatic carbon—carbon multiple bonds,
   (B) organosilicon compounds containing Si-bonded hydrogen atoms,
   (C) catalysts which promote the addition of Si-bonded hydrogen onto aliphatic multiple bonds and, if desired
   (D) agents which inhibit the addition of Si-bonded hydrogen onto aliphatic multiple bonds at room temperature,
wherein at least part of the organosilicon compounds containing Si-bonded hydrogen atoms (B) used are organosilicon compounds (B¹) comprising
   (a) units of the formula $$H_aR_{2-a}SiO_{2/2} \quad (I)$$

where R are identical or different and are each a monovalent, halogenated or unhalogenated hydrocarbon radical which is free of aliphatic multiple bonds and has from 1 to 8 carbon atom(s) per radical and
   a is 0, 1 or 2,
   with the proviso that at least 20 mol % of the units of the formula (1) are ones in which a is 1 or 2,
   (b) carbostructural units G (II)
   where G are identical or different and are each a trivalent to decavalent aliphatic hydrocarbon radical having from 7 to 30 carbon atoms per radical which may contain one or more heteroatoms selected from the group consisting of oxygen, boron, silicon, tin or titanium,
   with the proviso that at least three Si atoms are connected to one another via G,
   (c) units of the formula

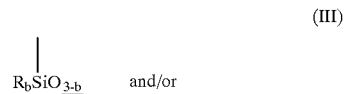
(III)

and/or

(III')

where R is as defined above,
   b is 0 1 or 2, with the proviso that b in formula (III') is not 2, and
   with the proviso that the units of the formula (III) or (III') are connected via the Si atoms to the carbostructural units G and
   (d) units of the formula $$H_cR_{3-c}SiO_{1/2} \quad (IV)$$

where R is as defined above,
   c is 0, 1 or 2,
   with the proviso that the organosilicon compounds (B¹) contain on average at least 6 Si-bonded hydrogen atoms.

2. A coating comprising the crosslinked crosslinkable composition as claimed in claim 1.

3. An organosilicon compound (B¹) which contains Si-bonded hydrogen atoms and comprises
   (a) units of the formula $$H_aR_{2-a}SiO_{2/2} \quad (I)$$

where R are identical or different and are each a monovalent, halogenated or unhalogenated hydrocarbon radical which is free of aliphatic multiple bonds and has from 1 to 8 carbon atom(s) per radical and
   a is 0, 1 or 2,
with the proviso that at least 20 mol % of the units of the formula (I) are ones in which a is 1 or 2,
   (b) carbostructural units G (II)
   where G are identical or different and are each a trivalent to decavalent aliphatic hydrocarbon radical having from 7 to 30 carbon atoms per radical which may contain one or more heteroatoms selected from the group consisting of oxygen, boron, silicon, tin or titanium,
   with the proviso that at least three Si atoms are connected to one another via G,
   (c) units of the formula

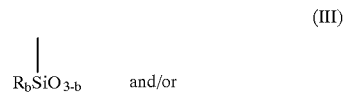
(III)

and/or

-continued $$R_bSiO_{\frac{2-b}{2}} \quad (III')$$

where R is as defined above, b is 0, 1 or 2, with the proviso that b in formula (III') is not 2, and with the proviso that the units of the formula (III) or (III') are connected via Si atoms to the carbostructural units G and (d) units of the formula $$H_cR_{3-c}SiO_{1/2} \quad (IV)$$

where R is as defined above, c is 0, 1 or 2, with the proviso that the organosilicon compounds ($B^1$) containing Si-bonded hydrogen atoms contain, on average, at least 6 Si-bonded hydrogen atoms.

4. A process for preparing organosilicon compounds ($B^1$) containing Si-bonded hydrogen atoms as claimed in claim 3, which comprises, in a first step, a) reacting aliphatic hydrocarbon compounds (1) containing aliphatic multiple bonds and having from 7 to 30 carbon atoms, which may each contain one or more heteroatoms selected from the group consisting of oxygen, boron, silicon, tin and titanium, with siloxanes (2) of the formula $$R^1R_2SiO(R_2SiO)_dSiR_2R^1$$

where R is as defined above, $R^1$ is as defined for R or is a hydrogen atom, with the proviso that at least 50 mol % of the radicals $R^1$ are hydrogen atoms and d is 0 or an integer from 1 to 200, in the presence of catalysts (3) which promote the addition of Si-bonded hydrogen onto aliphatic multiple bonds, where the ratio of Si-bonded hydrogen in siloxane (2) to aliphatic double bonds in hydrocarbon compound (1) is from 1.0 to 5.0, b) optionally, further reacting the compounds obtained in step a) with $C_4$— to $C_{22}$ alkenes (4) having a terminal aliphatic double bond in the presence of catalysts (3) which promote the addition of Si-bonded hydrogen onto aliphatic multiple bonds, and, c) equilibrating the compounds obtained in the step a) or step b) with organopolysiloxanes (5) which contain Si-bonded hydrogen atoms and comprise units of the formula (I), with the proviso that the resulting organosilicon compounds ($B^1$) containing Si-bonded hydrogen atoms comprise, on average, at least 20 mol % of units of the formula (I) in which a is 1 or 2 and at least 6 Si-bonded hydrogen atoms.

5. The process as claimed in claim 4, wherein the hydrocarbon compound (I) used is 1,2,4-trivinylcyclohexane.

6. The process as claimed in claim 4, wherein siloxanes (2) used are those of the formula $$HR_2SiO(R_2SiO)_dSiR_2H.$$

7. The process as claimed in claim 5, wherein siloxanes (2) used are those of the formula $$HR_2SiO(R_2SiO)_dSiR_2H.$$

8. The process as claimed in claim 4, wherein the organopolysiloxanes (5) containing Si-bonded hydrogen atoms which are used are ones selected from the group consisting of linear organopolysiloxanes having terminal triorganosiloxy groups and having the formula $$R_3'SiO(SiR_2'O)_rSiR_3',$$

where R' is as defined for R or is a hydrogen atom, r is 0 or an integer from 1 to 500, preferably from 10 to 200, linear organopolysiloxanes having terminal hydroxyl groups and having the formula $$HO(SiR_2'O)_sH,$$

where R' is as defined above and s is an integer from 1 to 1000, preferably from 10 to 500, branched organopolysiloxanes which may contain hydroxyl groups and comprise units of the formula $$R_3'SiO_{1/2}, R_2'SiO \text{ and } R'SiO_{3/2},$$

where R' is as defined above, cyclic organopolysiloxanes of the formula $$(R_2'SiO)_t,$$

where R' is as defined above and t is an integer from 3 to 12, and copolymers comprising units of the formula $$R_2'SiO \text{ and } R'SiO_{3/2},$$

where R' is as defined above.

9. The process as claimed in claim 5, wherein the organopolysiloxanes (5) containing Si-bonded hydrogen atoms which are used are ones selected from the group consisting of linear organopolysiloxanes having terminal triorganosiloxy groups and having the formula $$R_3'SiO(SiR_2'O)_rSiR_3',$$

where R' is as defined for R or is a hydrogen atom, r is 0 or an integer from 1 to 500, preferably from 10 to 200, linear organopolysiloxanes having terminal hydroxyl groups and having the formula $$HO(SiR_2'O)_sH,$$

where R' is as defined above and s is an integer from 1 to 1000, preferably from 10 to 500, branched organopolysiloxanes which may contain hydroxyl groups and comprise units of the formula $$R_3'SiO_{1/2}, R_2'SiO \text{ and } R'SiO_{3/2},$$

where R' is as defined above, cyclic organopolysiloxanes of the formula $$(R_2'SiO)_t,$$

where R' is as defined above and t is an integer from 3 to 12,
and copolymers comprising units of the formula $$R_2'SiO \text{ and } R'SiO_{3/2},$$

where R' is as defined above.

10. The process as claimed in claim 6, wherein the organopolysiloxanes (5) containing Si-bonded hydrogen atoms which are used are ones selected from the group consisting of linear organopolysiloxanes having terminal triorganosiloxy groups and having the formula $$R_3'SiO(SiR_2'O)_rSiR_3',$$

where R' is as defined for R or is a hydrogen atom,
r is 0 or an integer from 1 to 500, preferably from 10 to 200,
linear organopolysiloxanes having terminal hydroxyl groups and having the formula $$HO(SiR_2'O)_sH,$$

where R' is as defined above and
s is an integer from 1 to 1000, preferably from 10 to 500,
branched organopolysiloxanes which may contain hydroxyl groups and comprise units of the formula $$R_3'SiO_{1/2}, R_2'SiO \text{ and } R'SiO_{3/2},$$

where R' is as defined above,
cyclic organopolysiloxanes of the formula $$(R_2'SiO)_t,$$

where R' is as defined above and
t is an integer from 3 to 12,
and copolymers comprising units of the formula $$R_2'SiO \text{ and } R'SiO_{3/2},$$

where R' is as defined above.

11. The process as claimed in claim 7, wherein the organopolysiloxanes (5) containing Si-bonded hydrogen atoms which are used are ones selected from the group consisting of linear organopolysiloxanes having terminal triorganosiloxy groups and having the formula $$R_3'SiO(SiR_2'O)_rSiR_3',$$

where R' is as defined for R or is a hydrogen atom,
r is 0 or an integer from 1 to 500, preferably from 10 to 200,
linear organopolysiloxanes having terminal hydroxyl groups and having the formula $$HO(SiR_2'O)_sH,$$

where R' is as defined above and
s is an integer from 1 to 1000, preferably from 10 to 500,
branched organopolysiloxanes which may contain hydroxyl groups and comprise units of the formula $$R_3'SiO_{1/2}, R_2'SiO \text{ and } R'SiO_{3/2},$$

where R' is as defined above,
cyclic organopolysiloxanes of the formula $$(R_2'SiO)_t,$$

where R' is as defined above and
t is an integer from 3 to 12,
and copolymers comprising units of the formula $$R_2'SiO \text{ and } R'SiO_{3/2},$$

where R' is as defined above.

* * * * *